United States Patent
de Queiroz

[11] Patent Number: 6,075,886
[45] Date of Patent: Jun. 13, 2000

[54] METHOD AND APPARATUS FOR REDUCING THE COMPLEXITY OF COLOR CORRECTION USING SUBSAMPLING

[75] Inventor: Ricardo L. de Queiroz, Fairport, N.Y.

[73] Assignee: Xerox Corporation, Stamford, Conn.

[21] Appl. No.: 09/036,729

[22] Filed: Mar. 9, 1998

[51] Int. Cl.[7] ............................. G06K 9/00; G06K 9/34
[52] U.S. Cl. .......................................... 382/164; 358/523
[58] Field of Search ..................................... 395/109, 101, 395/106, 108, 114; 358/518, 525, 428, 523; 382/164, 165, 162, 300

[56] References Cited

U.S. PATENT DOCUMENTS

| | | | |
|---|---|---|---|
| H1684 | 10/1997 | de Queiroz et al. | 382/233 |
| 4,275,413 | 6/1981 | Sakamoto et al. | 358/80 |
| 4,887,150 | 12/1989 | Chiba et al. | 358/80 |
| 5,077,604 | 12/1991 | Kivolowitz | 358/75 |
| 5,087,126 | 2/1992 | Pochieh | 356/402 |
| 5,148,499 | 9/1992 | Matsumura | 382/300 |
| 5,187,570 | 2/1993 | Hibi et al. | 358/80 |
| 5,253,306 | 10/1993 | Nishio | 382/22 |
| 5,270,808 | 12/1993 | Tanioka | 358/527 |
| 5,293,228 | 3/1994 | Marti | 348/391 |
| 5,483,360 | 1/1996 | Rolleston et al. | 358/518 |
| 5,528,386 | 6/1996 | Rolleston et al. | 358/522 |
| 5,543,940 | 8/1996 | Sherman | 358/518 |
| 5,579,418 | 11/1996 | Williams et al. | 358/525 |
| 5,581,376 | 12/1996 | Harrington | 358/518 |
| 5,602,654 | 2/1997 | Patti et al. | 358/428 |
| 5,625,755 | 4/1997 | Shu | 395/109 |
| 5,696,848 | 12/1997 | Patti et al. | 382/300 |

*Primary Examiner*—Madeleine Nguyen
*Attorney, Agent, or Firm*—Aditya Krishnan

[57] ABSTRACT

The present invention is directed to a method and apparatus for improving the efficiency of color correcting subsampled color image data. More specifically, the present invention is directed to taking advantage of a method of applying a full conversion between color spaces on a master set of pixels in an image. New values are assigned to the remaining pixel subset by interpolating from the converted master set of pixels. The interpolation error is then added to the pixel subset, and the master set and subset are merged to produce a full converted color image set, which is subjected to further processing as a single unit.

19 Claims, 6 Drawing Sheets

METHOD AND APPARATUS FOR REDUCING THE COMPLEXITY OF COLOR CORRECTION USING SUBSAMPLING

The present invention is directed to a method of improving the efficiency of color correcting digital image data. More specifically, the present invention is directed to a method of processing digital images for color correction by performing the most complex portion of the color correction operation on a reduced set of data, and estimating corresponding values for the remainder of the data set. Simpler color correction operations are then performed on the entire set of data.

BACKGROUND OF THE INVENTION

Data reduction is required in data handling processes, where too much data is present for practical applications using the data. Generally speaking, digital images—images that have been discretized in both spatial coordinates and in brightness levels such as those acquired by scanning—are often large, and thus make desirable candidates for at least one form of data reduction. Notably, these digital images do not usually change very much between neighboring pixels, even when the visual appearance of the image varies dramatically throughout its entirety.

It is obviously desired to reproduce color images such that the colors in the copy exactly, or at least closely match the corresponding colors in the original image. Since image input and output devices are often quite different, reproducing an accurate color image often requires some form of color conversion to be applied to the imaging data before it is output. Systems and methods for converting original input device dependent image signals to output device dependent image signals are known to those skilled in the art. Issued U.S. patents which address such techniques include U.S. Pat. No. 5,077,604 to Kivolowitz et al., issued Dec. 31, 1991; U.S. Pat. No. 5,087,126 to Pochieh, issued Feb. 11, 1992; and U.S. Pat. No. 5,528,386 to Rolleston et al., issued Jun. 8, 1996. To one extent or another, each of these prior art systems and methods generally involve applying the input device dependent signals (i.e. RGB) to one or another systems of look-up tables by which they are converted to printer or other output device dependent signals (i.e. CMY or CMYK).

Full color correction in digital images is an image processing operation which typically takes place in two steps. First, each pixel in the image is corrected from 3-D input device dependent (i.e. RGB) or device independent (i.e. YCrCb, R'G'B', XYZ, or L*a*b) color space to a 3-D output device dependent color space (i.e. R"G"B" or CMY). Next, a conversion to CMYK takes place, which may include under-color removal (UCR), gray-component replacement (GCR) and linearization processes. Typically, the two color correction steps are accomplished in a single operation using a three-dimensional look-up table carrying out three-dimensional interpolation such as that described in U.S. Pat. No. 5,581,376 to Harrington. The color correction portion of the process may also be represented as the combination of two phases: a 3-3 color space correction (i.e. RGB-R'G'B') followed by a device-dependent color space transformation operation (i.e. R'G'B'-CMYK for four color devices). Unfortunately, use of the above described full color correction methods in the processing of digital image data requires large amounts of computer resources and use substantial amounts of CPU time. For this reason, color correction is typically applied to some reduced set of data related to the image rather than to the full digital image itself. The ability to separate the color correction process into two steps forms the basis for the present invention, where the more difficult of the two steps, namely the 3-3 color correction, can be performed on a substantially smaller amount of digital data so as to significantly expedite the overall correction process. The advantage is that the 3-3 color space correction operation may be performed on approximately 25% of the previously required information.

The time required for color conversions such as those described above is directly proportional to the amount of data to which it is applied, particularly during the first phase of color correction. More specifically, phase 1 color correction is typically very complex, and is preferably performed on a small number of pixels. The conversion which takes place in phase 2 is much simpler and is may be performed on a large amount of data. Thus, it is desirable in many applications to employ some form of data reduction in order to facilitate rapid processing of image data during phase 1 of the operation. In addition to compression, subsampling schemes are used in scanners, digital copiers or other devices that are used to reproduce, store or process color documents. Briefly, a subsampling scheme involves selecting some subset of the available original image data for subsequent image processing operations. This substantially reduces the volume of data that is subsequently generated and converted during phase 1, preferably with little or no impact on the appearance of the reproduced image.

The present invention may be used to reduce the resources required to reproduce a digital color image. Rather than performing color conversion on all of the pixels in an image, the method disclosed subsamples the image by selecting a subset of pixels for phase 1 color correction. Color values are then assigned to the remaining pixels by interpolation. The interpolation error is then added to the color corrected image, and that image subjected to phase 2 color conversion.

The following disclosures may be relevant to aspects of the present invention:

U.S. Pat. No. 4,275,413 to Sakamoto et al. issued Jun. 23, 1981 discloses a color space transformation where information is placed into lookup tables and stored in a memory—where the lookup table relates input color space to output color space. Sakarioto teaches a "unit cube interpolation unit" having known vertices. The lookup table is commonly a three dimensional table since color is typically defined with three variables.

U.S. Pat. No. 4,887,150 to Chiba et al. issued Dec. 12, 1989, discloses a device for converting RGB image signals first into CMY image signals, and then into CMYK signals. The color converting device includes a divider for dividing the image signals into achromatic and chromatic color components for each picture element; a first converter for converting the chromatic color components so divided into a first color conversion data; a second converter for converting the achromatic color component into a second color conversion data, or into a third color conversion data; an adder for summing the first and second color conversion data to provide the three color printing data, or an output circuit for outputting both the first color conversion data and third color conversion data as the four color printing data.

U.S. Pat. No. 5,187,570 to Hibi et a. issued Feb. 16, 1993, discloses a system for converting color image signals from one type to another, such as RGB to CMY. The system uses linear compression to convert values from one type of color signal to the other. A mono color image outputting system applies a color correction separated color signals in the input section and converts them into recording signals of color material, before outputting a color image. In the mono color outputting system, a gradation property of value data in the input section is linearly compressed to correspond to a gradation property of value data in the output section.

U.S. Pat. No. 5,270,808 to Tanioka issued Dec. 14, 1993, discloses a color image processing method and apparatus therefor, in which the input image data are converted into a color coordinate system represented by luminosity and hue, for example L*a*b* space. The colors reproducible on the output device, for example a printer, are also converted into this coordinate system. An average value is calculated over plural pixels in the vicinity of an object pixel to be digitized, and plural average values are then obtained by including the object pixel selected at each of the reproducible colors. The input image signal is digitized to the closest one of the plural average signals. The digitization error generated upon digitization is distributed to the succeeding pixels with weighted ratios. This method achieves faithful color reproduction, matching the colors reproducible on the recording or display device.

U.S. Pat. No. 5,293,228 to Marti issued Mar. 8, 1994, discloses a method for the coding of images represented by source signals by means of which a luminance signal is formed by linear combination, using positive coefficients of the source signals, and at least one color signal, the luminance and color signals being digitized, sampled at the same resolution, and subjected to a reversible mathematical transformation in the frequency domain.

U.S. Pat. No. 5,483,360 to Rolleston et al. issued Jan. 9, 1996, discloses a method of calibrating a color printer. First the color printer is operated to print color samples on a particular medium. The color samples are then optically measured to determine a colorimetic response of the printing apparatus to the printer signals.

U.S. Pat. No. 5,581,376 to Harrington issued Dec. 3, 1996, teaches the conversion of input device signals Rs, Gs, Bs, generated by an image input terminal, to calorimetric values Rc, Gc, Bc, the calorimetric values being processed to generate address entries into a lookup table to convert them to Cx, Mx, Yx, Kx colorant signals or any multi-dimensional output color space, which includes but is not limited to CMYK or spectral data. Values not directly mapped may be determined using tetrahedral interpolation over a hexagonal lattice where the lattice is formed by offsetting every other row in at least one dimension.

U.S. Pat. No. 5,625,755 to Shu issued Apr. 29, 1997, discloses an image processing method and apparatus which processes image data line by line using an error diffusion or dithering process to generate a halftoned image in which the radius of a dot representing a pixel is/dpi£r£ .sqroot.2/dpi. The method and apparatus selectively performs the halftone process on every other pixel to reduce in consumption and computation time while maintaining a high resolution.

United States Statutory Invention Registration Number H1684, by deQueiroz et al., titled "Fast Preview Processing for JPEG Compressed Images", issued Oct. 7, 1997, assigned to the assignee of the present invention, discloses a method of rapidly decompressing a document image compressed using transform coding for scaling and previewing purposes. A fast algorithm is derived by utilizing a fraction of all available transform coefficients representing the image. The method is particularly efficient using the discrete cosine transform which is used in the JPEG ADCT algorithm. In JPEG ADCT, a very fast and efficient implementation is derived for a resolution reduction factor of 16 to 1 (4 to 1 in each direction) without needing any floating point arithmetic operations.

Pending U.S. patent application Ser. No. 08/721,130 by deQueiroz, titled "Method and Apparatus for Processing of a JPEG Compressed Image", filed Sep. 26, 1996, and assigned to the assignee of the present invention, discloses a method and apparatus for processing images that have been compressed using a discrete cosine transform operation, and particularly JPEG compressed images. The rotation of image blocks is accomplished by sign inversion and transposition operations to accomplish intrablock operations. Subsequently, one of a number of alternative methods is employed to accomplish the same image processing on an interblock level, thereby enabling the rotation or mirroring of compressed images.

Pending U.S. patent application Ser. No. 08/770,765 by Klassen et al., titled "Color Correction of a Compressed Image", filed Dec. 19, 1996, and assigned to the assignee of the present invention, discloses a method for color correcting digital images that have been compressed. Aspects of the color correction are carried out on the compressed image data to improve computational efficiency. One of a number of alternative methods is employed to accomplish the color correction on lossy or losslessly compressed images. A second, simplified phase of the color correction may be applied subsequently to the decompressed image data in certain embodiments.

Pending U.S. patent application Ser. No. 08/770,768 by deQueiroz et al., titled "Multiresolution Color Correction Using Wavelet Transforms", filed Dec. 19, 1996, and assigned to the assignee of the present invention, discloses a color correction method which includes decomposing the original image into sub bands, applying the application to one or more sub bands and then recomposing the image, prior to color correction and color space transformation. The color correction may be applied to one of the lower resolution sub bands and a simpler color space transformation to the final image as a way to reduce the amount of computation.

Pending U.S. patent application Ser. Nos. 09/004,295 and 09/004,650 by Klassen et al., both titled "Method of Correcting Luminance and Chrominance Data in Digital Color Images", filed Jan. 8, 1998, and assigned to the assignee of the present invention, disclose methods and apparatus' for improving the efficiency of color correcting subsampled luminance and chrominance based data. More specifically, the inventions are directed to applying a full conversion between color spaces for one pixel in a selected pixel block. Chrominance values are assigned to the remaining pixels based upon their luminance values relative to the luminance value of the converted pixel.

All of the references cited herein ire incorporated by reference for their teachings.

Accordingly, although known apparatus and processes are suitable for their intended purposes, a need remains for a method and apparatus for converting color signals of a first type to equivalent color signals of a second type, wherein the color signals have been derived from an image that has a plurality of pixels arranged in two-dimensional space.

SUMMARY OF THE INVENTION

In accordance with one aspect of the invention there is provided a method of converting color signals of a first type, the color signals derived from an image having a plurality of pixels, to equivalent color signals of a second type, including the steps of segmenting the first type color signals into master signals and subordinate signals; providing estimated first type subordinate signals based on the first type master signals; deriving error signals which include errors generated during the estimating step; obtaining second type master signals which correspond to the first type master signals; approximating second type subordinate signals; based on the master set second type signals; and generating second type subordinate signals by accounting for the error signals in the approximate subordinate signals.

In accordance with another aspect of the invention there is provided an apparatus for converting color signals of a first type, the color signals derived from an image having a plurality of pixels, to equivalent color signals of a second type, including means for segmenting the first type color signals into master signals and subordinate signals; means for providing estimated first type subordinate signals based on the first type master signals; means for deriving error signals which include errors generated by the estimating providing means; means for obtaining second type master signals which correspond to the first type master signals; means for approximating second type subordinate signals based on the master set second type signals; and means for generating second type subordinate signals by accounting for the error signals in the approximate subordinate signals.

The present invention deals with a basic problem in digital image processing systems—the memory and computationally intensive operations of image processing, particularly color correction. One embodiment of the invention accomplishes color conversion of a by applying full color conversion techniques presently known in the art to only a small subset of the pixels in the image segment being processed. Color values are then assigned to the remaining pixels by interpolation. The interpolation error is then added to the color corrected image, and that image subjected to final color conversion. The techniques and system described herein are advantageous because they are efficient and result in the ability to accomplish basic image processing with little additional hardware or processing as compared to other memory intensive approaches.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method of accurately reproducing color images. More particularly, the present invention is directed to a method of reducing the time spent converting luminance and chrominance data in color images to printable form.

Figure 2:
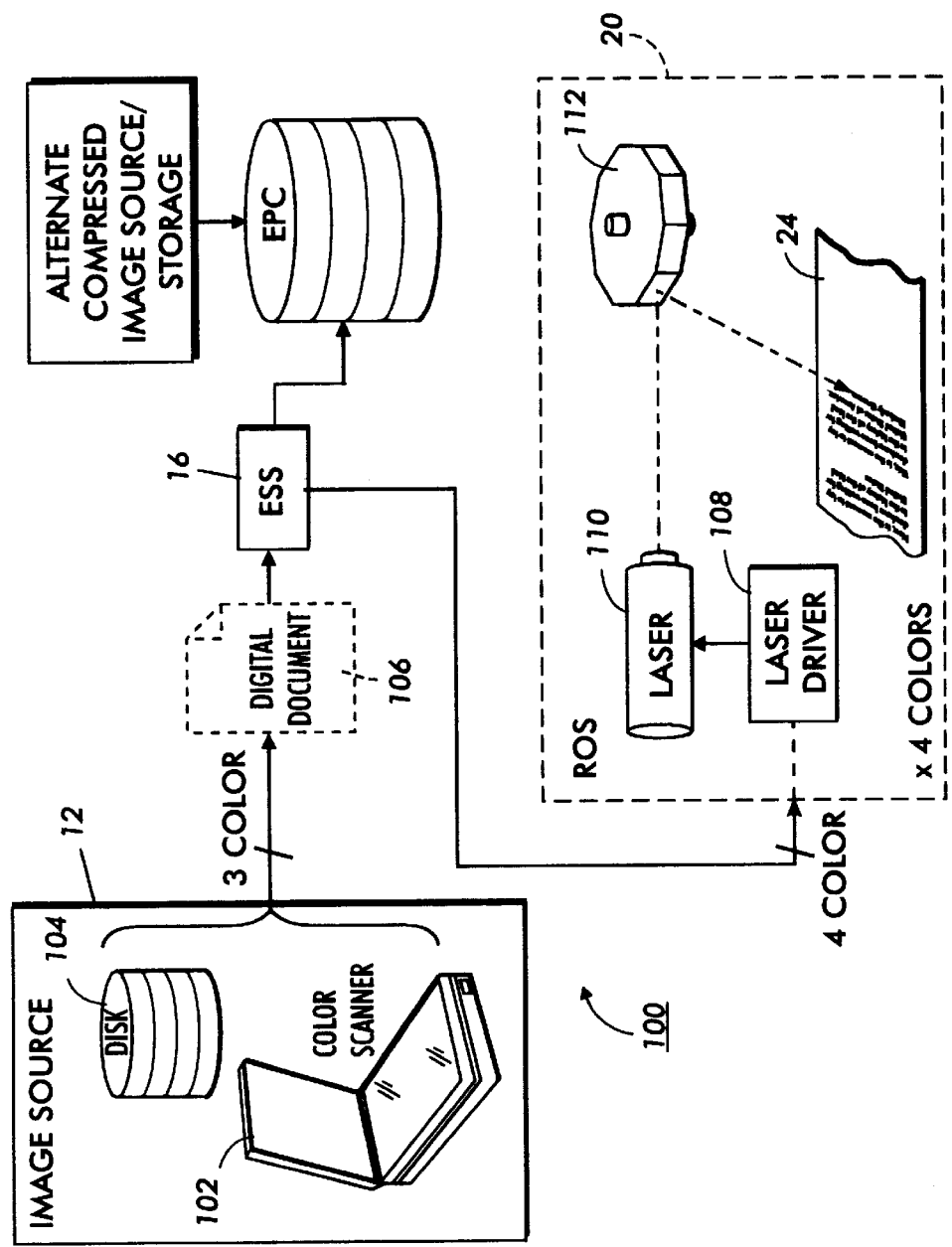
FIG. 2 is a generalized block diagram of a printing system which provides for one embodiment for the present invention.

For a general understanding of the features of the present invention, reference is made to the drawings. FIG. 2 is a block diagram of a digital color copier. In the embodiment described, the system consists of three parts: an image source 12, which may include a color scanner, a source of PDL (description language, i.e. PostScript) files, or similar image acquisition device; an electronic subsystem (ESS) 16, which performs various image processing operations, and in particular, color space conversions; and an output device 20. Output device 20 which may be a computer display monitor, a printer, computer storage or other similar apparatus receives data from the ESS and produces a viewable image or paper copies of the image. While the invention is described using a scanner as image source 12, other input sources are possible within the scope of this invention. In fact, while FIG. 2 illustrates a digital printing system 10 it will become evident from the following discussion that the present invention is equally well suited for use in a wide variety of copying and printing systems, including color scanners coupled with printing systems, image memory storage systems and other devices, and therefore are not limited in application to the particular systems shown herein.

Image source 12 commonly stores and transmits color information in a device-dependent form (specific to that input device), although it may convert it to device-independent form before transmission. Output device 20 requires data in a different device-dependent form (specific to the output device). The color space conversions required of ESS 16 include a possible conversion to device-independent form, and a conversion of device independent data to output device dependent form, as well as a direct conversion from input device dependent to output device dependent forms. It should be noted here that other (combinations of conversion techniques are possible, and the invention is not limited to these embodiments.

Figure 1:
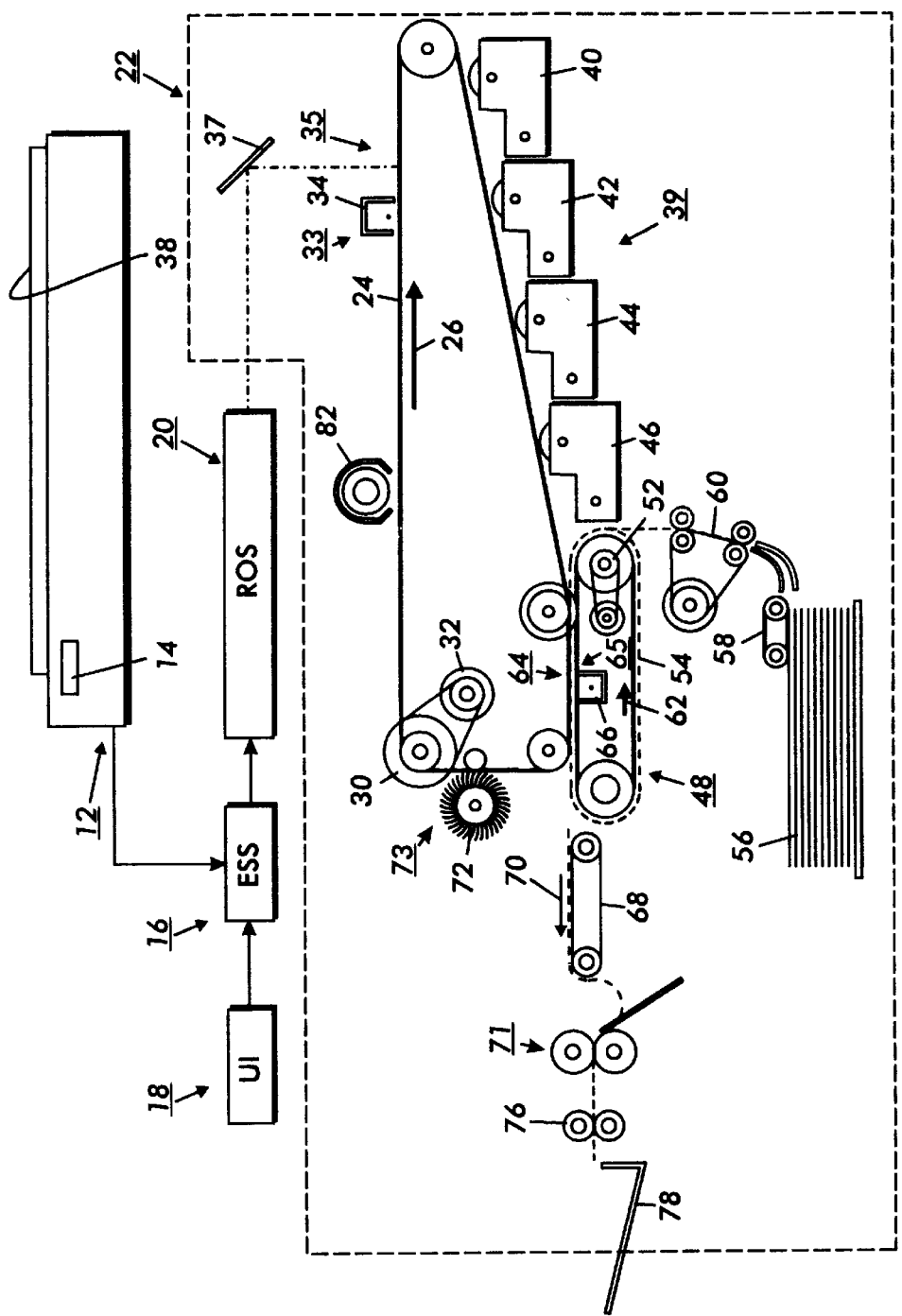
FIG. 1 is a schematic elevation view showing an electrophotographic printing machine which incorporates features of the present invention.

Referring now to FIG. 1, during operation of the printing system 10, a multiple color original document 38 is positioned on an image source 12. Image source 12 may include any number of image sources suitable for generating or otherwise providing a digital document, such as illumination lamps, optics, a mechanical scanning drive, a raster input scanner (RIS), and a charge coupled device (CCD array) or full width subsampling scanning sensor array 14. Image source 12 captures the entire image from original document 38 and among other things, measures a set of primary color reflectances (red, green and blue reflectances) at each point of the original document. Image source 12 may convert these reflectances to device independent coordinates, including possibly a luminance-chrominance space, or they may be left in a format that is dependent upon image source 12.

Image source 12 transmits image data as electrical signals to an image processing system (ESS), indicated generally by the reference numeral 16. ESS 16 converts the image data signals provided by image source 12 to either a set of device independent coordinates, or to coordinates that are dependent upon a designated output device. ESS 16 also contains data control electronics that prepare and manage the image data flow to a raster output scanner (ROS), indicated generally by the reference numeral 20. The ESS transmits signals corresponding to the desired image to ROS 20, which creates the output copy image. ROS 20 includes a laser with rotating polygon mirror blocks. Via mirror 37, ROS 20 illuminates the charged portion of photoconductive belt 24 of a printer or marking engine, indicated generally by the reference numeral 22 to achieve a set of subtractive primary latent images. ROS 20 will expose the photoconductive belt to record multiple latent images which correspond to the signals transmitted from ESS 16. Each latent image is developed with a developer material having a different colorant. A black latent image may be developed in lieu of or in addition to other (colored) latent images. These developed images are transferred to a copy sheet in superimposed registration with one another to form a multicolored image on the copy sheet. This multicolored image is then fused to the copy sheet to form a color copy.

Development of the images is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles used to develop the various latent images is adapted to absorb light within a preselected spectral region of the electromagnetic wave spectrum. By combining the different toners in various ratios, all printable colors are produced. Prior to printing, the image is divided into separations, that is, separate images, one per colorant. For example, in an image containing a green region, the corresponding region of the yellow and cyan separations will indicate a high value of colorant to be used, while the magenta separation will indicate a low value of colorant for the same region.

Once the latent image is produced, it can be developed as described with reference to FIG. 1, or it may be employed to drive or otherwise control any number of image output terminals, particularly color output devices where the data representing an image typically includes at least four color separations (i.e. cyan, magenta, yellow and black) each processed and stored as a separate image plane or in luminance-chrominance form to further reduce storage requirements.

Color correction is the process of converting data between color spaces which may be device dependent or device independent. Generally speaking, a scanner provides data in a scanner device dependent space, while a printer receives data in a printer device dependent space. Data may be converted from the scanner space to a device independent color space, and then from the device independent color space to device dependent printer space. Alternatively, data may be converted directly from the scanner space to the printer space. Conversion to the intermediate, device independent space offers several advantages. First, it allows the printer to be calibrated with respect to one device independent space, regardless of the input device. The scanner may similarly be calibrated independently from the printer. Second, use of an intermediate, device independent space allows other possible image processing operations to have a known, predictable effect, regardless of the input device characteristics. Also, use of an intermediate space allows color/brightness/saturation adjustments at the user interface. Thus, when user input is not desired it is possible to alter the present invention to convert directly from a device independent color space to an output device dependent color space without the use of an intermediate space. However when these advantages are not required, conversion from scanner to printer space is often acceptable.

Referring for a moment to FIG. 2, imaging data from image source 12 is generally provided to ESS 16 where tetrahedral interpolation processing (a well known technique for converting between color spaces) is performed to complete the color correction transformation. The color correction operation may be generally characterized as a function that maps a set of input device dependent, device independent or visually based color coordinates to a corresponding set of output device dependent coordinates. Due to the complex nature of this function, it is usually implemented as a three dimensional (3-D) lookup table with 3-D interpolation. The lookup table method is motivated entirely by efficiency of color transformation, and processing time is not considered.

The present invention includes a method and apparatus for converting digital color signals in an input device dependent color space, to equivalent color signals in an output device dependent color space. The input device dependent color image signals are typically obtained by scanning of a hardcopy image, by transmitting electronic digital color image data from an associated source such as a computer or a video image generator, or by other similar devices well known in the art. Similarly, the output device dependent color image signals are most often those suitable for reproduction on a color printer, for display on a color monitor, or for storage in a computer memory. In either case, the digital color signals generally represent pixels in a discretized color image.

Figure 3:
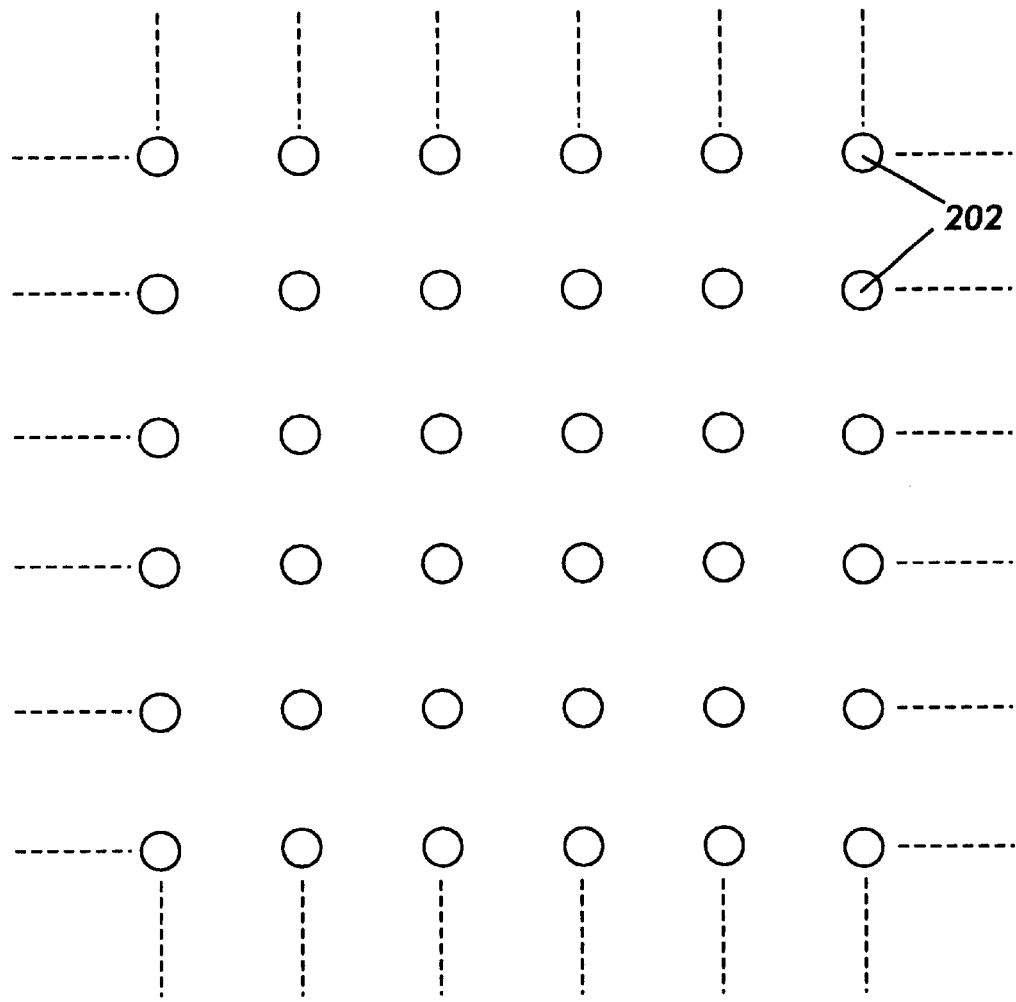
FIG. 3 contains an illustration of a typical full set of data acquired by an acquisition device configured as a rectangular grid of pixels.

Input device dependent color image signals are acquired as a full set of data as indicated schematically in FIG. 3. As shown, a full data set typically includes a continuous area filled with pixels 202 expanding in both the horizontal and vertical directions. Color image signals are provided for each pixel 202, thereby enabling a full description of image, including its color characteristics, in electronic form.

Figure 4:
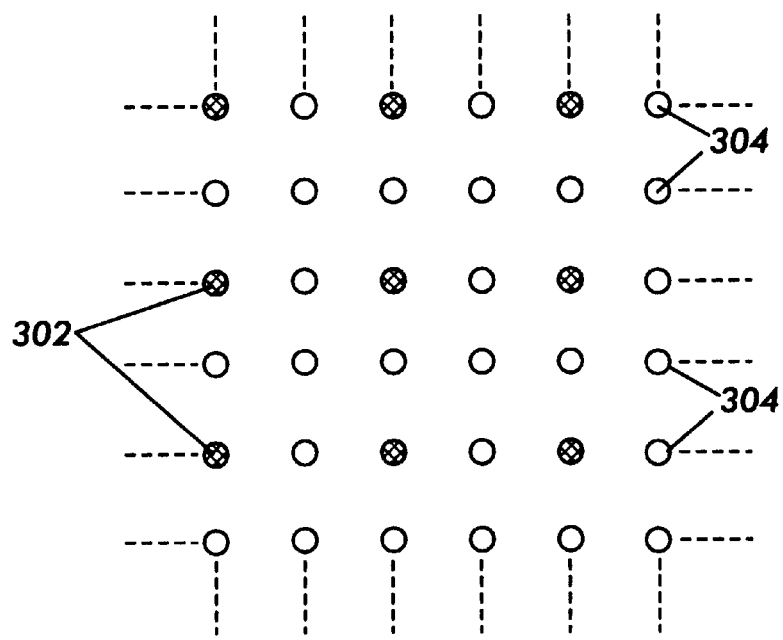
FIG. 4 contains a schematic illustration of a set of data as shown in FIG. 3, after subsampling by a factor of two in each direction.
Figure 5:
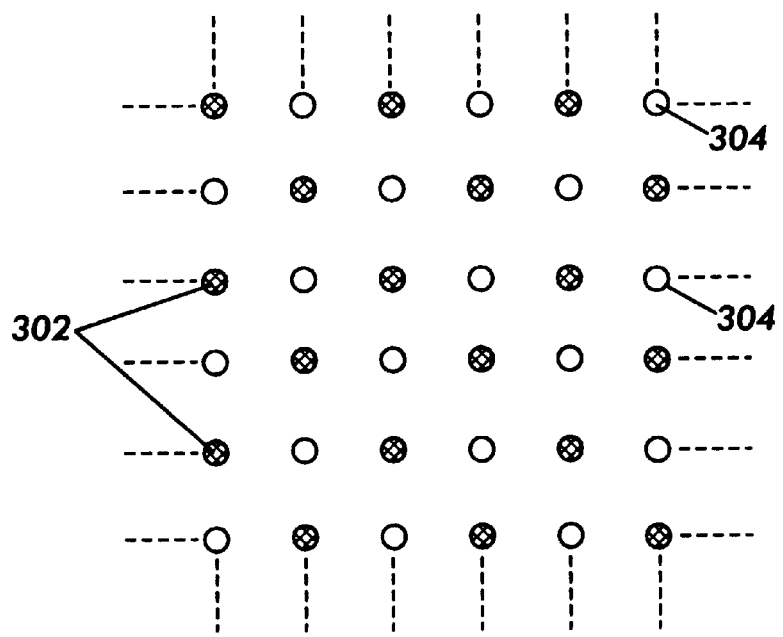
FIG. 5 contains a schematic illustration of a set of data as shown in FIG. 3, after subsampling in a quincunx format.

Referring now to FIGS. 4 and 5, the present invention first requires dividing the input device pixels into a set of master pixels 302 and a set of subordinate pixels 304. Dividing the digital image into two sets will typically be accomplished by some type of subsampling of the input device dependent data. In one embodiment of the invention, subsampling will simply occur by a factor of two in each direction as indicated in FIG. 4. In this format, the set of master pixels 302 will include approximately 25% of the input device dependent pixels 202. In another embodiment, shown in FIG. 5, the factor of two subsampling may take on the hexagonal or "quincunx" format, which means that the subsampling starting point for alternating rows will be staggered by one pixel 202. This form results in a set of master pixels that includes approximately 50% of the originally provided input device dependent pixels 202. While the invention is described here in conjunction with an image that has been subsampled by a factor of two in each direction, the invention is not limited to subsampling in this manner, and the subsampling need not be limited to the same amount in both directions. Thus, subsampling by factors of three or more in either or both directions may also be performed to practice the present invention.

Figure 6:
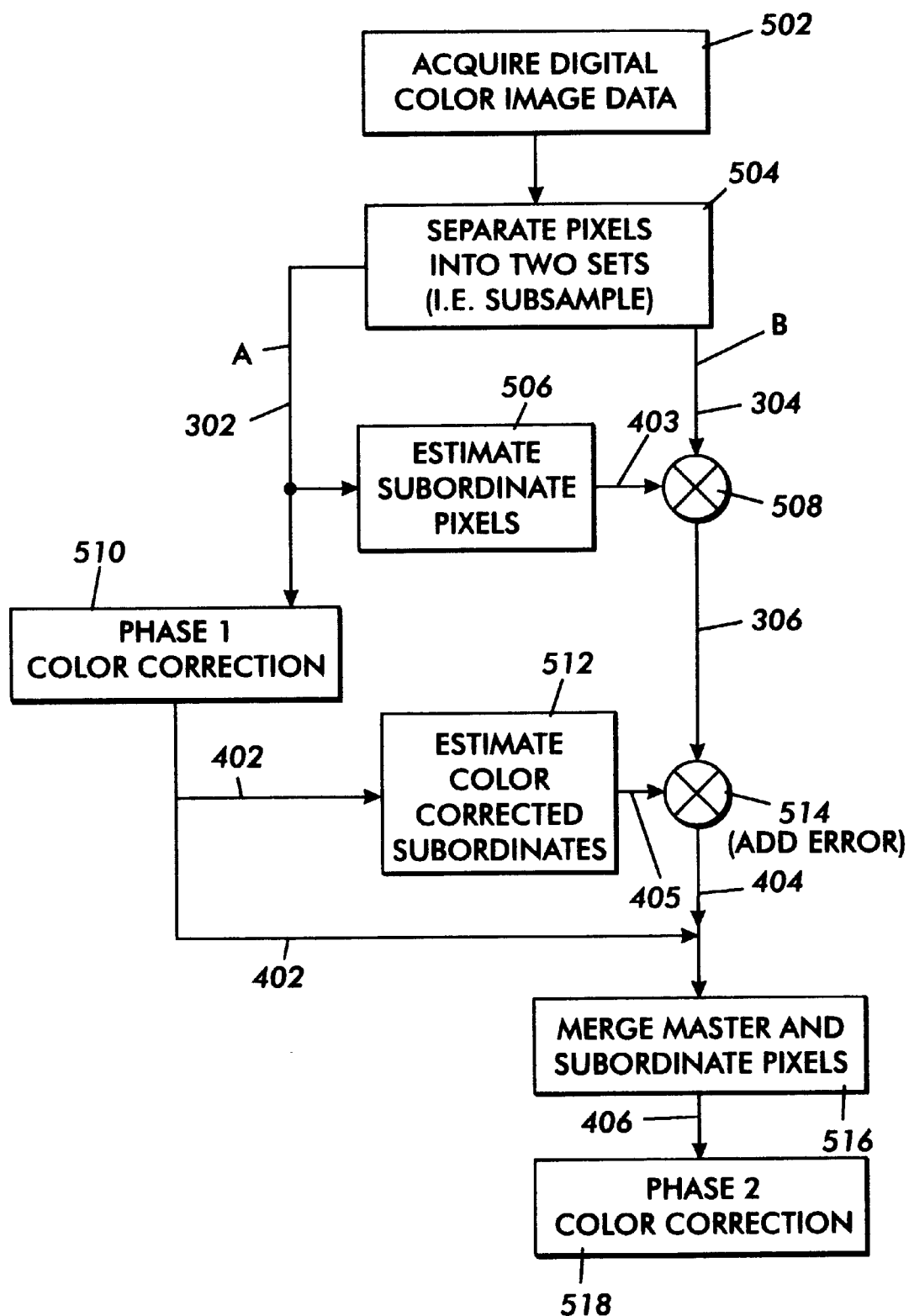
FIG. 6 is a generalized block diagram depicting a detailed illustration of the color correction method of the present invention.

Referring now to FIG. 6, acquisition of input device dependent digital image data is indicated at step 502, and the data is subsampled or otherwise separated into two portions as indicated in step 504 as previously described. Looking first at branch A, master pixel color image data is transmitted to two different places: subordinate pixel estimation block 506 and phase 1 color correction block 510. While identical data is provided to these two locations, each locations uses it for a different purpose.

The set of master pixels 302 (shown in FIGS. 4 and 5) are transmitted to phase 1 color correction at block 510. This will typically include mapping the input device dependent master pixels to output device dependent master pixels 402 using a look up table, or other well known device or method of completing accurate color correction.

With continued reference to FIG. 6, master pixels 302 are also submitted to subordinate pixel estimation block 506 in order to generate estimated input device dependent values 403 for the corresponding set of subordinate pixels 304. While the full set of input device dependent values is still for both master and subordinate pixels is still available, it is undesirable to use this full set to perform color correction as previously discussed. Thus, these estimated input device dependent values are shown to be most useful. Estimated input device dependent values are generated for the subordinate pixels using any one of many standard interpolation techniques.

An example of one way in which subordinate pixels may be estimated in the present invention is described here. However, it should be understood that the invention is not limited to the embodiment described.

Figure 7:
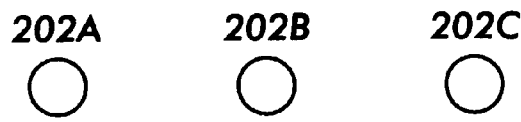
FIG. 7 contains a schematic illustration showing the correspondence between subsampled data and the full set from which it has been derived.
Figure 7:
Figure 7:
Figure 7:
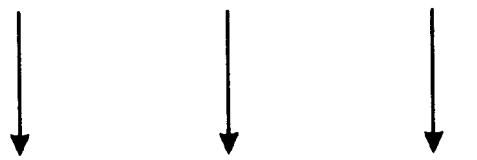
Figure 7:
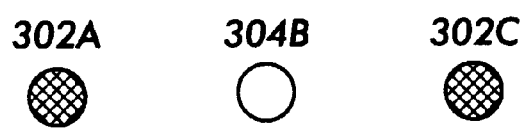
Figure 7:
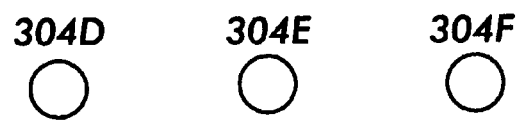
Figure 7:

Referring to FIG. 7, assume that input device dependent pixels 202A–202I were acquired with signal values of 0.63, 0.67, 0.72, 0.71, 0.69, 0.77, 0.62, 0.64, and 0.65 respectively. Assume also that the image is subsampled by a factor of two in each direction. Master pixels 302A, 302C, 302G and 302I retain their signal values 0.63, 0.72, 0.62 and 0.65, but estimated signal values will be assigned to subordinate pixels 304B, 304D, 304E, 304F and 304H using some type of interpolation. Averaging the two (or four) closest pixels will produce the following result:

304B=(0.63+0.72), 2=0.675

304D=(0.63+0.62), 2=0.625

304E=(0.63+0.72+0.6+0.65), 4=0.65

304F=(0.72+0.65), 2=0.685

304H=(0.62+0.65), 2=0.635

Thus, the above calculated values will serve as estimated values 403 for the actual set of subordinate pixels 304 (best illustrated in FIG. 4) in the example given above. Again, the numerical values assigned to pixels, as well as the interpolation technique explained are for illustration purposes only, and the invention may be practiced using numerous other possibilities.

Referring back to FIG. 6, estimated subordinate pixel values 403 are transmitted to location 508 for calculation of the error 306 generated by producing the estimated subordinate pixel set. Continuing with the example set forth above, in one embodiment of the invention, this error is calculated by simply obtaining the difference between the set of input device dependent pixels 202B, 202D, 202E, 202F and 202H and the original values of subordinate pixels 304B, 304D, 304E, 304F and 304H. In the above described example, the error values are:

Pixel B=0.67−0.675=−0.005

Pixel D=0.71−0.625=0.085

Pixel E=0.69−0.65=0.040

Pixel F=0.77−0.685=0.085

Pixel H=0.64−0.635=0.005

Again, these values are shown only for the illustration purposes only. It is not intended to limit the invention to these values, or to the interpolation method used herein. Further, the above listed values are not intended to provide an indication about the level of accuracy that can be expected when practicing the invention.

To summarize operation of the invention to this point, the set of master pixels 302 have been subjected to phase 1 color correction to produce a set of output device dependent master pixels 402 and have been used to produce a set of estimated subordinate pixel values 403. The error 306 generated while obtaining estimated subordinate pixels 304 has also been calculated. Still referring to FIG. 6, the present invention next requires using the output device dependent master signals 402 to obtain approximate output device dependent subordinate signals 405. In order to do this, a second interpolation must be performed on the set of output device dependent master signals 402. As before, this second interpolation can take place in many ways, including the method previously described. Thus, for a given subordinate signal, the values of the closest master signals may be averaged, and the value of approximate output device dependent subordinate signal 405 may simply be set equal to this average. The signals that are averaged may all be equidistant from the subordinate signal, or they may fall within some previously designated tolerance. Two, four, or any other appropriate number of pixels may be used. Again, this is merely one example of the method that may be used to interpolate output device dependent subordinate signal values. The only requirement is that those values be obtained using the values of output device dependent master signals 402.

The next step in this process requires accounting for the error 306 that was generated during creation of the set of estimated subordinate pixels 403. In one embodiment of the invention, error 306 is simply added to the values for each approximate output device dependent subordinate pixel 405, to produce output device dependent signals 404. While adding is used in the embodiment described, those skilled in the art will recognize that there are other ways to account for the error that is generated during an interpolation, most likely depending upon the interpolation method that has been used. It is intended to embrace all such alternatives and the invention is not limited to the embodiment described here. It should be noted here that while the subsampling embodiment shown in FIG. 4 has the advantage of providing for a smaller master signal set than that shown in FIG. 5, under some circumstances it may the disadvantage of providing for a less accurate set of approximate output device dependent subordinate signals 404. As described earlier, one way of interpolating to obtain the approximate pixel values is to average the values in the set of pixels that is closest to, yet equidistant from the selected master pixel. In the embodiment shown in FIG. 4, this set includes only two pixels while the set in FIG. 5 will usually include either four pixels. Again, other subsampling and interpolation methods may be used with the invention, and different methods will obtain different levels of accuracy. This should be taken into account when the subsampling and interpolation schemes are chosen.

Next, signals 402 and 404 are both submitted to block 516 to be merged into a single set of signals 406. The merger of signals 402 and 404 results in a complete set of phase 1 color corrected pixels that represents the entire input image. If desired, signals 406 may be converted to a third type of signal, notably by subjecting the phase 1 color Corrected signals to phase 2 color correction methods well known in the art, as indicated in block 518. Phase 2 color correction further processes output signals 406, and enables printing of these phase 1 color corrected signals on a color printer. While this step is not required to practice the invention, it is beneficial when hardcopy output is desired.

It is, therefore, apparent that there has been provided in accordance with the present invention, a method and apparatus for reducing the complexity of color correction using subsampling that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of converting color signals of a first type, said color signals derived from an image having a plurality of pixels, to equivalent color signals of a second type, comprising the steps of:

a) segmenting the first type color signals into master signals and subordinate signals wherein said first type color signals are digital color image signals in a first color space;

b) providing estimated first type subordinate signals based on said first type master signals;

c) generating error signals which include errors generated during said providing estimated first type subordinate signal step;

d) obtaining second type master signals which correspond to the first type master signals wherein said second type color image signals are digital color image signals in a second color space;

e) approximating second type subordinate signals based on said second type master signals;

f) generating second type subordinate signals by accounting for said error signals in said approximating second type subordinate signals; and g) merging said second type master signals and said second type subordinate signals to produce the second type color signals.

2. A method of converting color signals as claimed in claim 1 wherein said first type color image signals are acquired by scanning of a hardcopy image.

3. A method of converting color signals as claimed in claim 1 wherein said first type color image signals are acquired by transmission of electronic digital color image data from an associated source.

4. A method of converting color signals as claimed in claim 3 wherein said associated source is a computer.

5. A method of converting color signals as claimed in claim 3 wherein said associated source is a video image generator.

6. A method of converting color signals as claimed in claim 1 wherein said second type color image signals are suitable for display on a color monitor.

7. A method of converting color signals as claimed in claim 1 wherein said second type color image signals are suitable for storage in a computer memory.

8. A method of converting color signals as claimed in claim 1 wherein said second type color image signals are converted to third type color signals.

9. A method of converting color signals as claimed in claim 8 wherein said third type color image signals are suitable for reproduction on a color printer.

10. A method of converting color signals as claimed in claim 1 wherein said segmenting step comprises subsampling said first type color image signals.

11. A method of converting color signals as claimed in claim 10 wherein said subsampling is done by a factor of two in a horizontal direction and by a factor of two in a vertical direction.

12. A method of converting color signals as claimed in claim 11 wherein said factor of two subsampling is quincunx subsampling.

13. A method of converting color signals as claimed in claim 1 wherein said estimated first type subordinate signal providing step further comprises performing a first interpolation on said first type master signals.

14. A method of converting color signals as claimed in claim 1 wherein said second type master signal obtaining step further comprises mapping second type master signals to said first type master signals using a look up table.

15. A method of converting color signals as claimed in claim 1 wherein said second type subordinate signal approximation step further comprises performing a second interpolation on said second type master signals.

16. A method of converting color signals as claimed in claim 15 wherein said second interpolation comprises:

a) selecting a second type subordinate signal;

b) identifying a second type master signal set which includes a master signal that is closest to said selected second type subordinate signal;

c) calculating an average signal for said identified second type master signal set; and d) setting said selected second type subset signal equal to said average value.

17. A method of converting color signals as claimed in claim 16 wherein said identified second type master signal set includes only master signals that are equidistant from said selected subordinate signal.

18. A method of converting color signals as claimed in claim 17 wherein said identified second type master signal set includes four second type master signals.

19. A method of converting color signals as claimed in claim 17 wherein said identified second type master signal set includes two second type master signals.

* * * * *